United States Patent
Eul

(10) Patent No.: US 9,891,036 B2
(45) Date of Patent: Feb. 13, 2018

(54) MEASURING SYSTEM AND MEASURING METHOD FOR A ROAD CONSTRUCTION MACHINE

(71) Applicant: JOSEPH VOEGELE AG, Ludwigshafen/Rhein (DE)

(72) Inventor: Achim Eul, Mannheim (DE)

(73) Assignee: JOSEPH VOEGELE AG, Ludwigshafen/Rhein (DE)

(*) Notice: Subject to any disclaimer, the term of this patent is extended or adjusted under 35 U.S.C. 154(b) by 148 days.

(21) Appl. No.: 13/955,738

(22) Filed: Jul. 31, 2013

(65) Prior Publication Data

US 2014/0035555 A1 Feb. 6, 2014

(30) Foreign Application Priority Data

Aug. 1, 2012 (EP) ..................................... 12005607

(51) Int. Cl.
   *G01B 7/06* (2006.01)
   *H04L 29/12* (2006.01)
   *G05B 19/042* (2006.01)

(52) U.S. Cl.
   CPC ............. *G01B 7/06* (2013.01); *G05B 19/042* (2013.01); *H04L 61/2038* (2013.01); *H04L 61/6027* (2013.01)

(58) Field of Classification Search
   CPC ................. H04L 61/6027; G05B 2219/25032
   See application file for complete search history.

(56) References Cited

U.S. PATENT DOCUMENTS

| | | | | |
|---|---|---|---|---|
| 5,191,520 A | * | 3/1993 | Eckersley | H02J 1/14 307/35 |
| 5,356,238 A | * | 10/1994 | Musil | E01C 19/008 404/101 |
| 5,696,495 A | * | 12/1997 | Pietzsch et al. | 370/235 |
| 5,908,459 A | * | 6/1999 | Rower | E01C 19/48 404/84.1 |
| 5,929,536 A | * | 7/1999 | Stoll | F15B 13/0814 307/139 |
| 6,405,330 B1 | * | 6/2002 | Hanf et al. | 714/712 |
| 6,411,866 B1 | * | 6/2002 | Cavanagh | B60R 16/0315 455/149 |

(Continued)

FOREIGN PATENT DOCUMENTS

| | | |
|---|---|---|
| CN | 201113099 Y | 9/2008 |
| CN | 201549254 U | 8/2010 |

(Continued)

OTHER PUBLICATIONS

Japanese Office Action dated Feb. 15, 2012, Application No. 2013-157281, 2 Pages.

(Continued)

*Primary Examiner* — Son Le
*Assistant Examiner* — Adam Clarke
(74) *Attorney, Agent, or Firm* — Brooks Kushman P.C.

(57) ABSTRACT

A measuring system for a road construction machine includes a control unit which is operationally connected using a field bus to at least one field device, wherein an exclusive bus address is respectively assignable in the measuring system for each field device connected in the field bus. Furthermore, a method for addressing at least one field device is also provided.

18 Claims, 2 Drawing Sheets

(56) References Cited

U.S. PATENT DOCUMENTS

| | | | |
|---|---|---|---|
| 6,529,590 B1* | 3/2003 | Centers | 379/106.01 |
| 7,370,239 B2 | 5/2008 | Apel et al. | |
| 2003/0069668 A1* | 4/2003 | Zurn | E01C 19/006 700/245 |
| 2006/0020377 A1 | 1/2006 | Goetz et al. | |
| 2010/0182762 A1* | 7/2010 | Itomi | G01D 5/24452 361/807 |
| 2010/0294750 A1* | 11/2010 | Hogenmueller | B60R 16/023 219/202 |
| 2011/0091278 A1* | 4/2011 | Munz | E01C 19/40 404/118 |

FOREIGN PATENT DOCUMENTS

| | | |
|---|---|---|
| DE | 102007028926 B3 | 10/2008 |
| DE | 102008044777 A1 | 3/2010 |
| EP | 1284556 A1 | 2/2003 |
| EP | 2654246 A2 | 10/2013 |
| JP | 2008204463 A | 9/2008 |
| JP | 2009118155 A | 5/2009 |

OTHER PUBLICATIONS

Japanese Office Action dated Nov. 11, 2014, Application No. 2013-157281, Reference No. GM1306058, Dispatch No. 591459, 2 Pages.
European Search Report dated Jan. 7, 2013, Application No. EP 12 00 5607, 6 Pages.
Chinese Office Action dated Mar. 28, 2016, Application No. 201310331867.0, 8 Pages.
European Communication dated Mar. 7, 2016, Application No. 12 005 607.2-1802, Applicant Joseph Voegele AG,4 Pages.

* cited by examiner

MEASURING SYSTEM AND MEASURING METHOD FOR A ROAD CONSTRUCTION MACHINE

CROSS-REFERENCE TO RELATED APPLICATIONS

This application claims foreign priority benefits under 35 U.S.C. § 119(a)-(d) to European patent application number EP 12 005 607.2, filed Aug. 1, 2012, which is incorporated by reference in its entirety.

TECHNICAL FIELD

The present disclosure relates to a measuring system.

BACKGROUND

A known measuring system, which is used in a road construction machine for measuring layer thickness, comprises a control unit which is connected via a fieldbus to each of a plurality of, preferably, three elevation measuring sensors. For this, the control unit is for each of the three sensors provided with a respective connection box which is via a bus system connected with each respective sensor.

The use of a multi-connector strip is known which is integrated into the control unit and operatively connected thereto. The connector strip provides one socket for each of the sensors. Each socket is formed for the specific use with precisely one sensor type, where the sensors can each be connected via a respective fieldbus to the sockets. The problem with this is that the use of multiple sensors also requires the use of multiple fieldbus cables resulting in increased costs and complicated cabling.

Although the sockets provided in the connector strip of the control unit do not all need to be occupied, they cannot be occupied arbitrarily, however. Consequently, for the use of different sensors or different combinations of sensors, respectively, connector strips specifically adapted thereto must always be used in order to enable functional communication between the sensors and the control unit of the measuring system. This leads to undesirably high manufacturing costs. Moreover, the known measuring system is not flexibly usable due to the individually adapted connector strips.

In addition, addressing employed sensors is with the known measuring system unalterably predetermined, because the respective sensors will operate only in precisely that corresponding socket. Therefore, the application options of the known measuring system are rather limited.

Based on the measuring system described above, the disclosure is based on the object of improving a measuring system and a method using simple features technically designed such that it can be combined with a random number of different field devices and ensure flexible and reliable addressing of the individual field devices within the measuring system or by the measuring method, respectively.

SUMMARY

The disclosure relates to a measuring system for a road construction machine, in particular for a road finisher. The measuring system comprises a control unit which is operatively connected via a fieldbus with at least one field device. The field device comprises a voltage input and a voltage output, where a voltage input signal is transmittable from the control unit via the fieldbus to the voltage input of the field device.

It is provided according to the disclosure, that based on a magnitude of the voltage input signal, an exclusive bus address is assignable to the field device. In this, the field device is adapted to generate from said voltage input signal a voltage output signal, which differs by an offset voltage and is transmittable from the voltage output of the field device via the fieldbus to a voltage input of a further field device, so that based on the voltage output signal outputted by the field device, a different exclusive bus address in the measuring system can be assigned to the further field device.

Based on the disclosure, it is possible to expand the measuring system to any number of field devices, for example, sensors or actuators, where addressing the field devices connected in the measuring system can be easily performed by the connected field devices themselves.

In accordance with the disclosure, the respective field devices connected in the measuring system are configured to recognize their individual address based on the voltage level applied to the respective voltage input and to generate a cyclic CAN message which is transmittable via the fieldbus to the control unit. The control unit can by using the respective CAN message determine their identifier (CAN identifier) from the respective field device address (Heardbeat). It is also possible that the control unit can determine the respective sensor type by using the respective CAN messages and the user data contained therein. For example, if several sensors of the type "ultrasonic leveling sensor" are present and, for example, the operating mode "Big-ski" is activated at the control unit, then the mounting position of the sensors results from the sequence of cabling, i.e., from the address sequence.

Due to the addressing, it is also possible that other CAN identifiers are calculable and can be used for transmitting other messages, in each of which measurement data of the connected field devices is transmittable.

In accordance with the disclosure, each of the field devices connected in the measuring system is itself capable to perform addressing in the measuring system for itself using a voltage level applied at the voltage input, which differs among the field devices by a multiple of the offset voltage, so that error-free rapid communication of the respective field devices with the control unit is possible. A field device connected in the measuring system is therefore designed such that it assigns itself a bus address.

For example, a field device directly connected via the fieldbus to the control unit assigned itself the bus address 1 based on a voltage input signal transmitted by the control unit. If the field device is connected via the fieldbus to the control unit, there is a voltage input signal of, for example, 0.5 volts applied at the voltage input of the field device. With an offset voltage of preferably 0.5 volts, the field device generates a voltage output signal of respectively 1 volt from this voltage input signal. While the field device, in which the voltage input signal is 0.5 volts, based thereupon assigns itself the bus address of 1, the other field device determines its bus address, for example bus address 2, based on the now changed voltage input signal of 1.0 volts. Addressing further field devices can be continued in this manner. The measuring system can therefore be extended as desired with other field devices.

Preferably, the value of the voltage input signal being transmitted by the control unit to the field device corresponds to the value of the offset voltage. For example, the voltage input signal as well as the offset voltage are each, as described above, 0.5 volts. Alternatively, the voltage input signal as well as the offset voltage can each amount to a multiple of 0.1 volts. This makes it possible to generally calculate the bus address of the respective field device using the quotient of the voltage input signal applied to the respective field device and the offset voltage (bus address=voltage input signal at the respective field device (V)/offset voltage (V)). It is also possible according to this embodiment to perform integer addressing, starting out with 1.

For example, a field device, which is connected to two field devices which are already serially connected (first field device has bus address 1 and second field device has bus address 2), for an initial voltage input signal outputted by the control unit of 0.3 volts, which is increased by the first field device by the respective offset voltage of 0.3 volts to 0.6 volts and by the second field device to 0.9 volts, would assign itself the bus address 3, because now being the third field device connected in series, it receives the voltage input signal of 0.9 volts where the offset voltage is at of 0.3. The resulting quotient is therefore 3, which corresponds to the bus address.

Alternatively, however, it would also be possible that the voltage input signal outputted by the control unit and the offset voltage comprise different voltage levels. For an initial voltage input signal of 0.5 volts and a selected offset voltage of 0.1 volts, the field device immediately connected with the control unit would receive the bus address 5, followed by the bus address 6, etc. In this manner, energy consumption of the measuring system can be adapted as desired and improved.

Preferably, the voltage input is an analog voltage input with a value range of 0 to 20 volts. Starting out with at a voltage input signal of 0.5 volts and with a stepwise increase of the voltage input signal by respectively 0.5 volts offset voltage, it would be possible to address up to 40 field devices in the measuring system. The voltage input is preferably an A/D converter. It allows conversion of the analog voltage input signal to a digital voltage signal which can be further processed well to the voltage output signal using the offset voltage.

However, it is also conceivable that the analog voltage input of the respective field devices located in the measuring system is formed with an even greater value range than mentioned above, for example, with a value range of 0 to 50 volts. This is especially advantageous when the field device is to be used in combination with a wide variety of other field devices in a complex measuring system according to the disclosure.

Preferably, the voltage output has an analog voltage output with a value range of 0 to 20 volts. As previously described, this value range can be extended at random so that different complex measuring systems can be created according to the disclosure. The voltage output according to a further embodiment comprises a D/A converter. It can analogize the voltage output signal generated with the offset voltage, so that it can well be transmitted to a voltage input of a field device subsequently connected in the fieldbus.

For precisely addressing the respective field devices within the measuring system according to the disclosure, it is advantageous if the offset voltage is an integer multiple of 0.1 volts, preferably 0.5 volts. For addressing, for example, three field devices that are operatively connected in series via the fieldbus with the control unit, and for an applied voltage input signal of 0.5 volts at the voltage input of the first field device and having 0.5 volts as an offset voltage, a stepwise increase of the voltage input signal by 0.5 volts can therefore be generated at the respective voltage inputs of the field devices. The voltage input of the second field device according to this example therefore has a voltage input signal of 1 volt applied, and at the voltage input of the third field device a voltage input signal of 1.5 volts. With an offset voltage of 0.5 volts, the respective field devices can uniquely assign themselves a bus address.

According to another embodiment of the disclosure, it is provides that assignment of a respective exclusive bus address for the field devices connected to the measuring system is performed automatically. In this, a field device newly connected to the measuring system automatically generates a bus address for itself which has not yet been assigned to another field device in the measuring system. This makes it possible to create functional communication between the control unit and the connected field devices in a particularly simple manner. By automatic bus addressing, the measuring system according to the disclosure can be easily extended by the operating staff.

It is preferably provided that, by newly connecting each further field device to the fieldbus, an exclusive bus address is automatically assignable to each newly connected field device. Therefore, an operator no longer needs to worry about a socket specially intended for that fieldbus not being available. Instead, it is thereby possible to functionally extend the measuring system as desired by adding additional field devices.

The measuring system can be used in a particularly flexible manner when the fieldbus is at least partially designed as a cable-to-cable connection, preferably as spiral cables. The measuring system is thereby particularly flexibly employable at the road construction machine and can be easily attached to the same at different points.

Preferably, the fieldbus is a digital fieldbus, whereby good communication can be set up between the control unit and the field devices connected thereto. Advantageously, the fieldbus is a CAN-bus system, with which very fast communication between the field devices and the control unit can be established.

In order to adapt the measuring system to different conditions of use, it is preferably provided that a plurality of field devices can be detachably connected to the fieldbus. It is thereby possible that the field devices are easily exchangeable and can, in particular, in case of defect be replaced by other field devices. Due to the exchangeability of the field devices, it is also easily possible to alter the measuring system as desired in its functionality or in its complexity to adapt it to different measuring requirements.

Particularly rapid data transfer between the field devices and the control unit is possible when a plurality of field devices is operatively connected in series to the control unit by means of the fieldbus. It is possible by connecting the field devices in the fieldbus like a daisy chain, especially for the operating staff, to easily maintain an overview over the assembly of the measuring system, which contributes to improved usability of the measuring system.

Particularly simple handling is given when the field device is preferably respectively connected with a Y-distributor to the fieldbus. By using the Y-distributor, it is possible to operationally connect a field device quickly and easily in the measuring system or to remove it from the measuring system, respectively.

Even if a field device and the Y-distributor attached thereto are removed from a chain of field devices connected to the fieldbus, the resulting gap can easily be closed by the fieldbus in that the released end sections of the fieldbus are simply plugged together. As a result therefrom, it is possible that the field devices perform new addressing in order to compensate for the removed field device.

As an alternative to a connection of the respective field device or devices to the fieldbus with a Y-distributor, it can be provided that the field device comprises each an input connector for receiving the voltage input signal and an output connector for transmitting the voltage output signal, via which it can be connected to the fieldbus. In this, it is preferably provided that an input connector has a fieldbus section coupled to it via which the voltage input signal is transmitted, and the output plus has a different fieldbus section coupled to it via which the voltage output signal is transmitted. This makes it possible to not necessarily be reliant upon a field device type specific to a manufacturer, but to operationally connect field devices from different manufacturers in the measuring system.

In road construction, the measuring system according to the disclosure can be particularly advantageously used when the field device is a sensor or an actuator. If the field device is designed as a sensor, it can, for example, be a leveling or material flow sensor. Just as well, however, the sensor could be designed as an ultrasound single sensor, wide-range sensor or a mechanical sensor to advantageously be operationally integrated into the measuring system.

According to a particular embodiment of the disclosure, it is provided that the control unit is an external operating station of the road construction machine. By using the external operating station, an operator during installation of a new pavement can retrieve and/or actuate the field devices connected in the measuring system, so that real-time installation monitoring is possible during paving, whereby irregularities when installing the pavement can be quickly reacted to.

Moreover, it would also be possible that the measuring system is preferably operatively connected to actuators of the road construction machine which are provided for installation, such that their adjustment occurs in dependency of recorded measurements by the field devices of the measuring system. This enables automatic controlling of the actuators of the road construction machine based on the values actually detected by the field devices. In this manner, for example, unevenness in the plane during installation of the pavement can be reacted to in that there is an automatic position control of the screed of the road finisher.

The disclosure also relates to a method for addressing at least one field device in a measuring system of a road construction machine. In this, the field device is connected using a field bus with a control unit of the measuring system, wherein the control unit transmits a voltage input signal to the voltage input of the field device, based on the magnitude of which an exclusive bus address is allocated to the field device. It is according to the disclosure provided that the field device, based on a magnitude of the voltage input signal, generates a voltage output signal which differs by an offset voltage and which is transmitted from a voltage output of the field device via the fieldbus to a voltage input of a further field device. It is thereby possible, that an exclusive bus address in the measuring system is also assigned for the further field device based on the voltage output signal outputted by the field device.

According to the disclosure, the voltage output of one field device is coupled with the voltage input of another field device, so that when daisy-chaining several field devices, the voltage input signal gradually increases from field device to field device due to the offset performed by the respective field devices. Based upon the increasing input voltage signals, the field devices can each for themselves establish an individual bus address with which reliable communication with the control unit can be established.

With the method according to the disclosure, it is possible to establish a flexible measuring system adapted to the situation, in particular, for use with a road construction machine. Previously known connector strips being provided at the control unit to operationally connect a limited number of sensors to the control unit are no longer necessary. The measuring system and the method according to the disclosure also prevents that the operating staff connects field device incorrectly to the control unit or that the connectors are connected in the wrong places.

An embodiment of the disclosure is explained below in more detail with reference to the figures described below.

DETAILED DESCRIPTION

Figure 1:
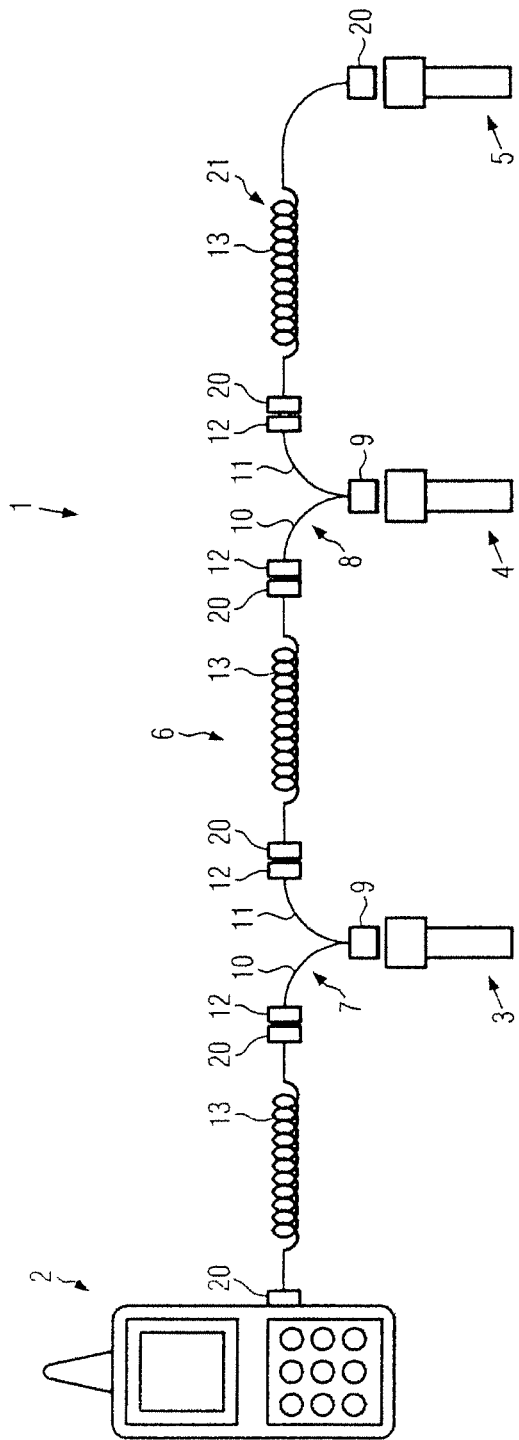
FIG. 1 shows an embodiment of a measuring system according to the disclosure.

FIG. 1 shows a measuring system 1 according to an embodiment of the disclosure. The measuring system 1 comprises a control unit 2, which is designed according to FIG. 1 as an external operation station.

As field devices, the measuring system 1 comprises a first sensor 3, a second sensor 4 and a third sensor 5. All sensors 3, 4, 5 are operationally connected in series by a field bus 6 with the control unit 2. Via the fieldbus 6, the control unit 2 can communicate with the sensors 3, 4, 5, so that measurement values detected by the sensors 3, 4, 5 can be transmitted to the control unit 2 and processed by the latter.

According to this embodiment of the disclosure, the field bus 6 comprises a first Y-distributor 7 and a second Y-distributor 8. The first Y-distributor 7 connects the first sensor 3 to the field bus 6 and the second Y-distributor 8 connects the second sensor 4 to the field bus 6. The measuring system according to the disclosure, however, is not limited to the first and second Y-distributors 7, 8, but can be extended by further Y-distributors depending on the number of sensors used in the measuring system.

The Y-distributors 7, 8 each comprise a sensor terminal 9 which can be coupled to the respective sensor 3, 4, 5 in order to operationally connect the respective sensor 3, 4, 5 via the associated Y-distributor to the field bus 6.

First and second connector sections 10, 11 extend from each Y-distributor 7, 8 to connect the respective Y-distributor 7, 8 to the fieldbus 6. The two Y-distributors 7, 8 are each coupled via the sensor terminal 9 to the sensors 3, 4. With the sensor terminal 9, each respective end of the first and second connector sections 10, 11 run together. At another end of each of the first and second connector sections 10, 11, a respective distribution connector 12 is provided which couples the respective Y-distributor 7, 8 to a cable section 13 of a spiral cable 21 of the field bus 6. For coupling the respective distribution connectors 12, the spiral cable sections 13 comprise cable connectors 20 that are each formed at the ends of the spiral cable sections 13. They are adapted to be operatively connected to the distribution connectors 12, the sensors 3, 4, 5 and the control unit 2. It is also possible, to design the cable connectors 20 such that they can be operationally connected to each other, for example, to form a fieldbus section.

The sensors 3, 4 are connected with the Y-distributors 7, 8 to the fieldbus 6, where the third sensor 5 is connected directly to a cable connector 20 of the spiral cable section 13. Together, sensors 3, 4, 5 are operationally connected in series to the control unit 2.

Figure 2:
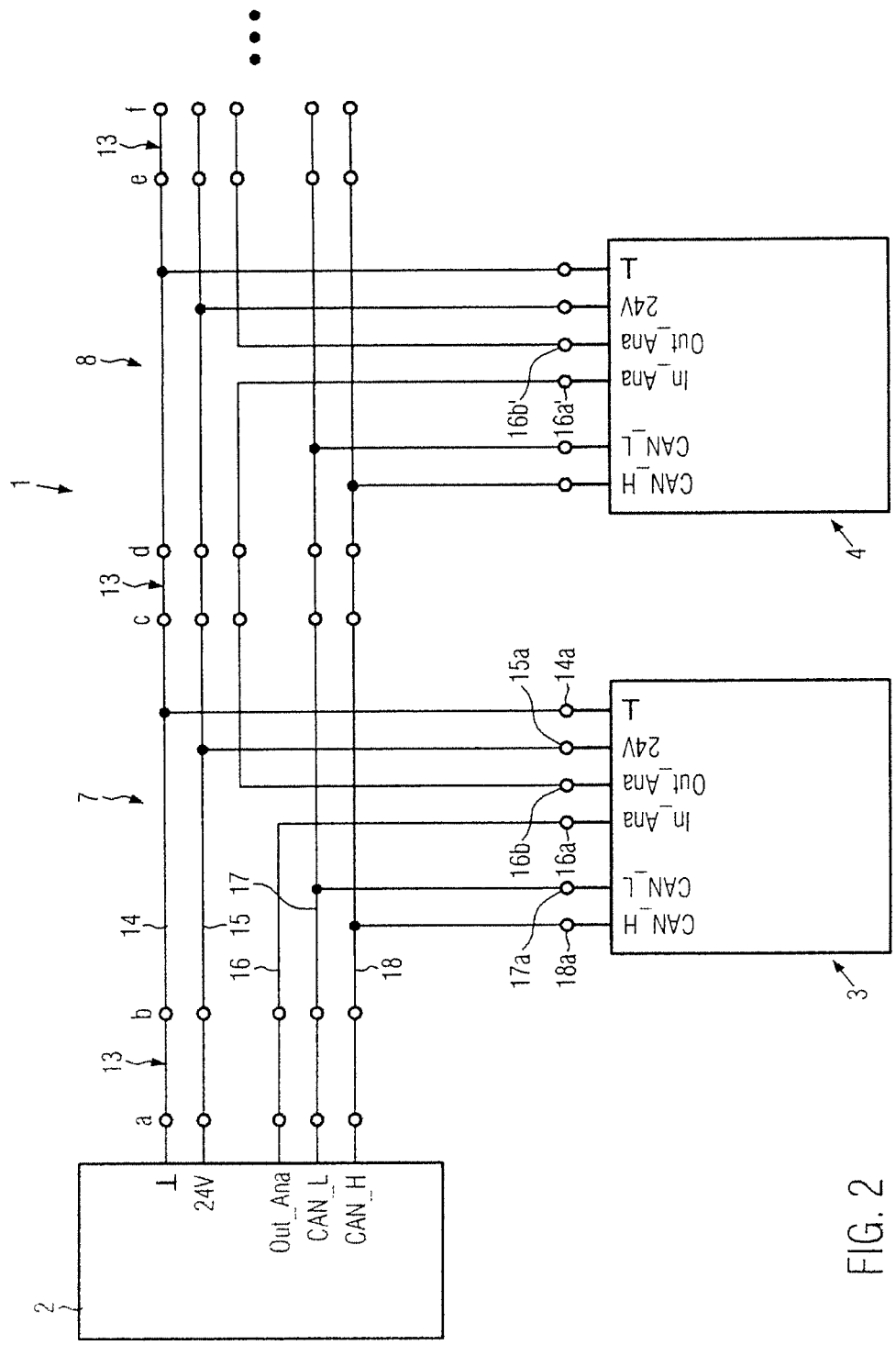
FIG. 2 shows a circuit diagram of a measuring system according to the disclosure.

FIG. 2 shows a schematic diagram of the measuring system 1 according to the disclosure. The first and the second sensors 3, 4 are each connected via the first and second Y-distributors 7, 8 to the cable sections 13 of the fieldbus 6 and connected via the latter to the control unit 2.

A total of six interfaces a, b, c, d, e and f in the fieldbus 6 are schematically shown in FIG. 2. Between the interfaces a and b, c and d, and e and f, the cable section 13 is respectively formed. The interface a, b, c, d, e and f in FIG. 2 schematically illustrate the connections between the cable connectors 20 and the distribution connectors 12, which are shown in FIG. 1.

The first Y-distributor 7 is located between the interfaces b and c and the second Y-distributor 8 between interfaces d and e. In the schematic diagram in FIG. 2, only the first and the second sensors 3, 4, are connected to the fieldbus 6. However, this is not intended to be any restriction to the disclosure. Rather, it is possible to extend the measuring system 1 as desired.

According to FIG. 2, the fieldbus 6 comprises a ground line 14, an operating voltage line 15, a voltage line 16 for addressing the sensors 3, 4, and first and second communication lines 17, 18 which are each connected to the sensors 3, 4 and operationally connect them to the control unit 2.

The ground line 14 is connected to the sensors 3, 4 at a respective ground input 14a. The operating voltage line 15 is connected to an operation input 15a of the sensors 3 and 4. Usually, an operating voltage of 24 volts is applied to the operating voltage line 15.

The voltage line 16 is used by the sensors 3, 4 to each assign themselves an exclusive bus address. The voltage line 16 is connected to a voltage input 16a and to a voltage output 16b of the first sensor 3, where a voltage input signal is transmittable by means of the voltage line 16 via the voltage input 16a to the first sensor 3 and changed by an offset voltage to a voltage output signal, which is transmittable via the voltage output 16b to the fieldbus section of the voltage line 16 being arranged between the sensors 3 and 4. It is thereby possible to transmit different voltage levels from sensor to sensor via the voltage line 16.

The voltage output signal outputted by the first sensor 3 via the voltage output 16b is a voltage input signal for the second sensor 4 and differs by the aforementioned offset voltage from the voltage input signal of the first sensor 3. This enables the sensors 3, 4 to generate their individual bus address based on the different voltage input signals, so that unique addressing of the sensors 3, 4 occurs in the measuring system 1.

The voltage input signal, for example 0.5 volts, outputted by the control unit 2 can be tapped at the voltage input 16a. With an offset voltage of 0.5 volts, for example, there would then at the voltage output 16b of the first sensor 3 be a voltage output signal of 1.0 volts which can be tapped at the voltage input 16a' as the voltage input signal of the second sensor 4. Based on this example, a voltage output signal of 1.5 volts is applied at the voltage output 16b' of the second sensor 4.

The communication lines 17, 18 are provided for data transfer between the control unit 2 and the sensors 3 and 4 connected in the measuring system 1. The sensors 3, 4 can also communicate bi-directionally with the control unit 2 via the communication lines 17, 18. For connecting the communication lines 17, 18, communication ports 17a, 18a are respectively provided on the sensors 3 and 4.

According to the schematic diagram, the measuring system 1 can be extended by further sensors. The sensors 3, 4, the cable sections 13 and the Y-distributors 7, 8 can be assembled in a modular manner, such that different variants of the measuring system 1 are created.

The principle of the measuring system according to the disclosure can be used in different industrial sectors and is not only designed for use with a road construction machine. Moreover, the measuring system according to the disclosure is used inter-divisionally in all technical fields of the industries While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A measuring system for a road construction machine, the measuring system comprising:
a control unit;
a field bus; and
first and second field devices operationally connected to the control unit using the field bus, each of the field devices defining one of a sensor and an actuator,
the field bus comprising at least two cable sections and at least two Y-distributors, each of the Y-distributors being connected to one of the field devices to define voltage input and output of the respective field device, the first cable section being connected between the control unit and the voltage input of the first field device and the second cable section being connected between the voltage output of the first field device and the voltage input of the second field device,
wherein each of the cable sections defines a spiral cable including: a ground line, first and second communication lines, an operating voltage line configured to transmit an operating voltage signal between the control unit and each of the field devices to power the field devices, and an addressing voltage line configured to transmit one of a first addressing voltage signal from the control unit to the voltage input of the first field device and a second addressing voltage signal from the voltage output of the first field device to the voltage input of the second field device,
wherein a magnitude of the operating voltage signal is different from a magnitude of the first addressing voltage signal,
wherein each of the field devices assigns itself an exclusive bus address based on a quotient of respective magnitudes of an offset voltage and the addressing voltage signal received at the voltage input of the field device, and
wherein the magnitude of the second addressing voltage signal received at the voltage input of the second field device is based on a sum of the respective magnitudes of the first addressing voltage signal received at the voltage input of the first field device and the offset voltage, such that the respective exclusive bus addresses of the field devices are different from one another.

2. The measuring system according to claim 1 wherein the addressing voltage signals are analog voltage signals having a value range of 0 to 20 volts.

3. The measuring system according to claim 1 wherein the offset voltage is an integer multiple of 0.1 volts.

4. The measuring system according to claim 1 wherein the offset voltage is 0.5 volts.

5. The measuring system according to claim 1 wherein the assignment of a respective exclusive bus address for each of the field devices is performable automatically.

6. The measuring system according to claim 1 wherein the system is configured such that an exclusive bus address is automatically assignable to an additional field device when the additional field device is connected to the field bus.

7. The measuring system according to claim 1 wherein the field bus is at least partially designed as cable-to-cable connection.

8. The measuring system according to claim 1 wherein the field bus is a digital field bus.

9. The measuring system according to claim 1 wherein the field bus is a CAN-bus.

10. The measuring system according to claim 1 wherein the first and second field devices are detachably connected to the field bus.

11. The measuring system according to claim 1 wherein the first and second field devices are operationally connectable in series to the control unit using the field bus.

12. The measuring system according to claim 1 wherein the first field device is connected to the field bus with a Y-distributor.

13. The measuring system according to claim 1 wherein the first field device comprises an input connector for receiving the voltage input signal and an output connector for transmitting the voltage output signal, and wherein the first field device can be connected to the field bus via the input connector and the output connector.

14. The measuring system according to claim 1 wherein the road construction machine is configured for installing pavement, and wherein the control unit is an external operating station of the road construction machine.

15. A method for addressing first and second field devices in a measuring system of a road construction machine configured to install pavement, wherein the first and second field devices are connected via a field bus with a control unit of the measuring system, the method comprising:
    transmitting, by the control unit, a voltage input signal via the field bus to a voltage input of the first field device;
    assigning a first exclusive bus address to the first field device based on a first quotient of respective magnitudes of the voltage input signal and an offset voltage;
    generating, by the first field device, a voltage output signal based on a sum of the magnitude of the voltage input signal and the offset voltage;
    transmitting the voltage output signal from a voltage output of the first field device via the field bus to a voltage input of the second field device; and
    assigning a second exclusive bus address to the second field device based on a second quotient of respective magnitudes of the voltage output signal output by the first field device and the offset voltage,
    wherein respective magnitudes of the first and second quotients are different from one another, wherein each of the first and second field devices defines one of a sensor and an actuator, wherein the field bus comprises at least two cable sections and at least two Y-distributors, each of the Y-distributors being connected to one of the field devices to define the voltage input and output of the respective field device, the first cable section being connected between the control unit and the voltage input of the first field device and the second cable section being connected between the voltage output of the first field device and the voltage input of the second field device, wherein each of the cable sections defines a spiral cable including: a ground line, first and second communication lines, an operating voltage line configured to transmit an operating voltage signal between the control unit and each of the field devices to power the field devices, and an addressing voltage line configured to transmit one of the voltage input signal from the control unit to the voltage input of the first field device and the voltage output signal from the voltage output of the first field device to the voltage input of the second field device, and wherein a magnitude of the operating voltage signal is different from a magnitude of the first addressing voltage signal.

16. The method according to claim 15 wherein the first and second field devices are sensors.

17. A road construction machine for installing pavement, the road construction machine comprising:
    a screed;
    an actuator associated with the screed for controlling position of the screed; and
    a measuring system operatively connected to the actuator, the measuring system including:
        a control unit;
        a field bus; and
        first and second field devices operationally connected to the control unit using the field bus, the first and second field devices comprising sensors, the field bus comprising at least two cable sections and at least two Y-distributors, each of the Y-distributors being connected to one of the field devices to define voltage input and voltage output of the respective field device, the first cable section being connected between the control unit and the voltage input of the first field device and the second cable section being connected between the voltage output of the first field device and the voltage input of the second field device,
    wherein each of the cable sections defines a spiral cable including: a ground line, first and second communication lines, an operating voltage line configured to transmit an operating voltage signal between the control unit and each of the field devices to power the field devices, and an addressing voltage line configured to transmit one of a first addressing voltage signal from the control unit to the voltage input of the first field device and a second addressing voltage signal from the voltage output of the first field device to the voltage input of the second field device,
    wherein a magnitude of the operating voltage signal is 24 volts and is different from a magnitude of the first addressing voltage signal,
    wherein the control unit is configured to transmit a first addressing voltage signal via the addressing voltage line of the field bus to the voltage input of the first field device, and, based on respective magnitudes of the first addressing voltage signal and an offset voltage, the first field device is configured to assign itself a first exclusive bus address, wherein the first field device is adapted to generate from the first addressing voltage signal a second addressing voltage signal that differs from the first addressing voltage signal by the offset voltage and that is transmittable from the voltage output of the first field device via the addressing voltage line of the field bus to the voltage input of the second field device, and wherein the second field device is configured to assign itself a second exclusive bus address based on the second addressing voltage signal generated by the first field device, wherein the first and second exclusive bus addresses are different from one another.

18. The measuring system according to claim 1 wherein the magnitude of the first addressing voltage signal is equal to the offset voltage.

\* \* \* \* \*